(12) United States Patent
Duret et al.

(10) Patent No.: US 7,241,961 B2
(45) Date of Patent: Jul. 10, 2007

(54) TIG WELDING METHOD

(75) Inventors: Jean-Michel Duret, Bondoufle (FR); Pascal Guerniou, Chilly Mazarin (FR)

(73) Assignee: SNECMA Moteurs, Paris (FR)

( * ) Notice: Subject to any disclaimer, the term of this patent is extended or adjusted under 35 U.S.C. 154(b) by 43 days.

(21) Appl. No.: 11/130,140

(22) Filed: May 17, 2005

(65) Prior Publication Data

US 2005/0258144 A1    Nov. 24, 2005

(30) Foreign Application Priority Data

May 18, 2004    (FR) .................................. 04 05416

(51) Int. Cl.
   *B23K 9/167* (2006.01)
(52) U.S. Cl. .......................................... 219/61; 219/75
(58) Field of Classification Search .................. 219/75, 219/61
   See application file for complete search history.

(56) References Cited

U.S. PATENT DOCUMENTS 3,205,340 A    9/1965    Gotch ..................... 219/137 R
3,769,489 A  * 10/1973    Charlesworth ............. 219/60.2
4,481,399 A  * 11/1984    Greenfield ................. 219/60.2

FOREIGN PATENT DOCUMENTS

DE    196 23 103 A1  * 12/1997
DE    199 26 796 A1    12/2000

* cited by examiner

*Primary Examiner*—Kevin P. Kerns
(74) *Attorney, Agent, or Firm*—Oblon, Spivak, McClelland, Maier & Neustadt, P.C.

(57) ABSTRACT

A TIG welding method of welding a first part with a first wall and an end edge to a second part with a second wall and an edge along a junction surface between said edges and along which the first wall forms a salient angle with the second wall. The TIG welding electrode is moved along the junction surface to weld the first part to the second part. The electrode being aligned on the side of the salient angle at an angle ($\beta$) with respect to the first wall smaller than 180° and with the longitudinal axis of the electrode running through the re-entrant angle associated with the salient angle.

10 Claims, 2 Drawing Sheets

TIG WELDING METHOD

FIELD OF THE INVENTION

The invention relates to arc welding of two parts together by force of a refractory electrode under inert gas atmosphere.

The invention further relates to the welding of a first metal part to a second metal part, both parts being butt-jointed. In particular, the invention concerns the connection of a cylindrical part, such as a spark plug guide, to an orifice provided in a second part, such as a combustion chamber jacket for a gas turbine motor.

BACKGROUND OF THE INVENTION

A combustion chamber is generally annular in shape, and comprises a jacket providing axial openings upstream for letting air through and means of fuel distribution in the chamber enclosure. Close to such means, the jacket exhibits on its peripheral wall radial openings for letting through fuel sparking plugs. The plugs are fixed to the wall by force of spark plug guides which are globally cylindrical. These spark plug guides are welded by their front edge along the edge of an orifice provided in the wall of the jacket.

Currently the TIG welding method is performed manually. FIG. 1 represents the position of both parts. The spark plug guide tube 1 is engaged in the machined orifice 3 through the wall 5 of the combustion chamber before welding. The wall of the chamber, represented in axial section, exhibits a curve also in this axial direction. The edge of the orifice 3 is chamfered so as to provide a space with the external edge of the tube. Welding consists in placing a tungsten electrode T torch 7 above said space while bringing the metal by means of a rod B. During a first pass, a first bead is deposited at the bottom of the space for deeper penetration of the welding. In a second pass, the whole space is filled up.

This manual mode exhibits the shortcoming of requiring high dexterity from the operator by reason of the complexity of the junction zone. Besides, progressing along the welding bead, he must adapt permanently the quantity of energy to bring since the thicknesses and masses to be welded are not constant. Welding is not even. There ensue deformations requiring in particular final heating of the assembly to relax the internal stresses occurred in particular during the welding operation. Surface irregularities, inside the chamber or in the guide tube, involve moreover re-machining of the welding bead. Sometimes also, the stresses are high enough to generate cracks in the junction zone.

It should be reminded that Tungsten Inert Gas—TIG welding is an electric arc welding method with refractory electrode under gaseous atmosphere. This technique is used with or without any filler metal. Inert gas, generally argon— or helium-based, separates from the air the molten metal, the hot zones and the tungsten electrode. Any oxidisation is thereby prevented. In an inert gas stream, an electric arc is caused to flash between the infusible tungsten electrode and the part to be welded. The heat generated by the arc melts the edges of the part and any filler metal contributing to the formation of the welding bead. TIG welding is a manual or automated method. It is reserved for small and medium thicknesses, less than 5–6 mm, since the welding speeds for greater thicknesses are less than those of the other methods.

SUMMARY OF THE INVENTION

The present invention intends to remedy the shortcomings encountered with manual welding, as applied until now.

According to the invention, the TIG welding method of a first part with a first wall and an end edge to a second part with a second wall and an edge, both parts being welded to one another along a junction surface between said edges and along which the first wall forms a salient angle with the second wall, characterised in that the electrode is moved along said surface, the electrode being laid out on the side of the salient angle according to an angle ($\beta$) with respect to the first wall smaller than 180°, the direction (D) of the electrode running through the re-entrant angle associated with the salient angle.

The salient angle is, in each position of the electrode along the weld seam, the angle greater than 90° defined by both walls.

In the method of the invention, the material composing the part to be welded without any external filler is used, and by arranging the electrode with respect to the junction surface or jointing plane, the melting bath and the welding bead in progress are pushed into the associated re-entrant angle. Preferably, the energy applied is sufficient for a fillet or a bulb to be formed in the re-entrant angle associated with the salient angle. Consequently, welding two parts may easily be automated by means or relatively simple equipment, in a single pass.

The invention applies first of all to the welding of parts whereof the first one is cylindrical. An orbital-type welding machine is used advantageously, known for welding tubes. The trajectory of the tip of the electrode is circular in this case.

A filler material is supplied advantageously by one of the walls which is provided so as to form a projection before welding.

Advantageously, the direction D runs through the intersection of the first and second walls of the re-entrant angle, at least over a portion of the rotation of the electrode holder.

According to a particular embodiment of the method, the second wall exhibits a countersink against which the end edge of the first wall rests before welding. This embodiment is advantageous when the wall of the second part is in the form of a spherical cap or similar or still exhibits sufficient curving radius.

In order to take into account the complex geometry of the parts to be welded, the displacement speed of the electrode and the intensity of current passing therethrough are caused to vary. Both these parameters are adjusted in relation to the in relation to of both parts in the local geometry in the junction zone along the trajectory of the tip of the electrode and of thermal pumping, if necessary.

The invention also refers to the electrode holder mounted on the machine for the implementation of the method. The machine comprises an electrode holder and a driving means to move the driving means following a set trajectory. In particular, the driving means rotates the electrode around a fixed axis during welding. The technique known as orbital welding is hence used. In particular, the driving means has variable speed. The electrode holder of the invention comprises an axial portion and a means for fixing the electrode according to a set angle with respect to said axis. Preferably, such angle is not of 90°; such angle is comprised between 0 and 180°. It is set so that the angle $\beta$ of the electrode with respect to the in consideration to has as constant a value as possible during the rotation of the electrode holder.

BRIEF DESCRIPTION OF THE DRAWINGS

We shall now describe a non-limiting embodiment of the invention while referring to the appended drawings wherein.

DETAILED DESCRIPTION OF THE EMBODIMENTS OF THE INVENTION

Figure 2:
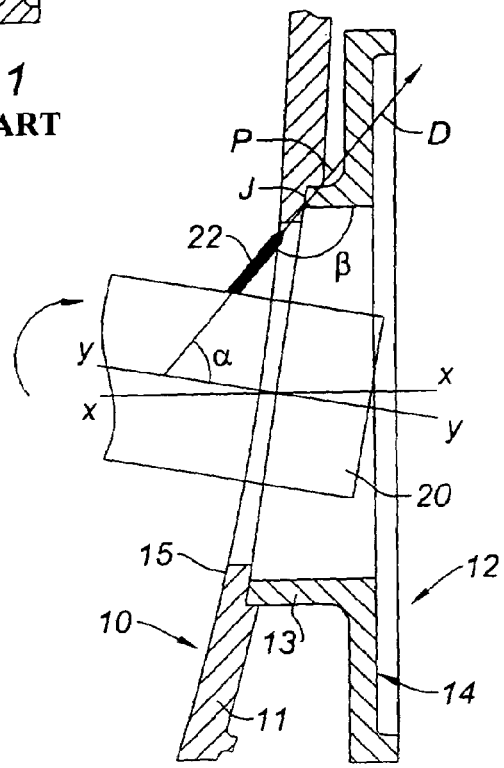
FIG. 2 shows a first embodiment of the welding according to the invention.

FIG. 2 represents the portion of the external jacket 11 of a combustion chamber 10 of a turbojet engine situated at the level of a passage orifice of a spark plug. The plug has not been represented nor the remainder of the jacket. A spark plug guide 12 enables the spark plug to be held in place inside the combustion chamber. This first part of the spark plug guide 12 is a cylindrical portion 13 alone axis XX and the second part of the spark plug guide 12 is a mounting flange 14 situated along the outward extension of the cylindrical portion 13.

The external jacket 11 of the chamber is substantially cylindrical in shape with a section generally in the form of a spherical cap directed upstream. Axial openings, not represented, are provided therein to let through means for supplying the chamber with fuel and combustion air. The spark plugs ignite the air-fuel mixture.

To fix the guide 12 to the jacket 11, a circular through-orifice has been bored. The thickness of the wall has been reduced over the periphery of the orifice by countersinking with perpendicular axis YY, to form a bearing surface against which the cylindrical part 13 is placed by its end edge. Said surface constitutes here the jointing plane J. The end edge and the bearing surface are in the same plane. The axis YY forms here an angle with the axis XX by reason of the curving of the jacket of the chamber. It can be seen on the Figure that the diameter of the opening provided in the jacket 11 is slightly smaller than that of the tube 13. Such portion forms an annular projection 15 whereof the function is to constitute a filler metal for welding.

To weld both parts together, a TIG welding machine is used, whereof only the tip of the electrode holder 20 can be seen.

A TIG welding installation of orbital type is known in itself. It comprises a current generator and a welding head. The welding head is mounted on a seating, and comprises a bracket for the electrode holder with its gas envelope. The bracket is mobile on its seating, to enable tight fitting of the electrode with respect to the welding zone. The electrode holder is in the form of a pen or axial bar. A mechanism causes the electrode holder to revolve around its axis. The assembly is connected to a programmable automaton. This automaton controls all the parameters influencing the welding process: the values of the electric current, the orbital forward speeds of the tip of the electrode, the heating times and the protection gas flow rates, argon for example. The automaton breaks down a cycle of 360° into a number of set sequences. 486 for example, whereof each may contain different parameter values. It is thus possible to vary the parameters for each position of the electrode over its orbital trajectory in relation to the local thickness of the parts or the presence of thermal pumping zones.

The electrode holder 20 is placed coaxially to the axis YY perpendicular to the junction plane between both parts. It carries a tungsten electrode 22 forming a set angle α with the axis YY. The representation is schematic, the protection gas guiding skirt cannot be seen. The electrode is oriented in the salient angle formed by a first wall of the cylindrical portion 13 and a second wall of the jacket 11 by projection 15.

The electrode forms an angle β with the first wall of the cylindrical portion 13 such as the direction D of the axis of the electrode goes through the projection 15. Preferably, the direction D is comprised in the re-entrant angle formed by the first wall and second wall complementary to 360° of the salient angle above.

The angle β is comprised between 0 and 180°. The electrode is placed preferably so that its direction D goes through the jointing plane J, in particular in the centre thereof and runs through the point P which lies at the intersection of the first wall with the second wall in the re-entrant angle.

The angle α is selected in relation to the angle β so that, regardless of the orbital position of the electrode around the axis YY, its direction D is always oriented correctly. Preferably, it is set so as to confer to the angle β a value which varies as little as possible throughout the rotation of the electrode holder. This tilting of the electrode with respect to the junction surface stirs the melting bath and forms a welding bead which does not require preferably any re-machining.

For welding the parts, the cylindrical portion 13 is placed first of all on the jacket 11 resting against the prepared surface. It is fixed therein provisionally. Then the electrode is placed so that its rotational axis goes through the bearing plane and the axis XX. The tip of the electrode lies at a distance enabling to form the welding arc.

The machine is started. The electrode holder rotates around its own axis from the initial position determined according to the automaton program. The displacement speed of the head of the electrode has been programmed as well as the intensity of current passing through the electrode in relation to the angular position thereof as it is rotating. Indeed it can be seen that the quantity of metal under the arc is not constant because of the complex geometry of the parts. A homogeneous welding bead is formed by adapting both these parameters to the geometry. The protection gas flow rate is also adapted. For example for welding a spark plug guide tube, there may be provided a cycle of 360° with five or six angular sequences where the forward speeds of the electrode head and the intensity of the welding current differ.

An example of cycle is as follows:

|  | Sequence 1 | Sequence 2 | Sequence 3 | Sequence 4 | Overlapping sequence 5 |
|---|---|---|---|---|---|
| Angular rotation sector | 35° | 105° | 75° | 145° | 5° |
| Speed cm/min. | 20 | 22 | 26 | 28 | 17 |
| Intensity A | 40 | 41 | 41 | 38 | 35 |
| gas flow rate l/min. | 5 | 5 | 6 | 7 | 3 |

Figure 1:
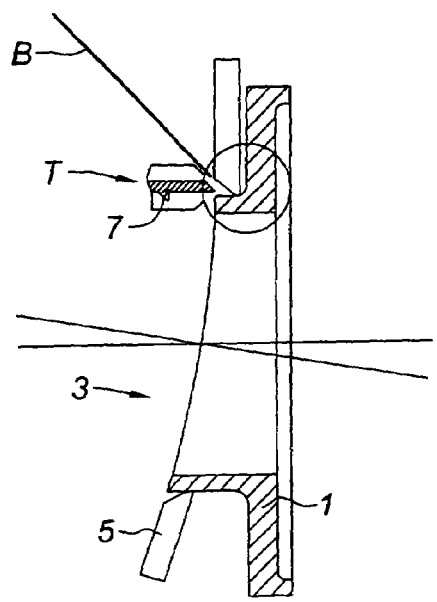
FIG. 1 shows the manual welding mode according to the previous art.
Figure 3:
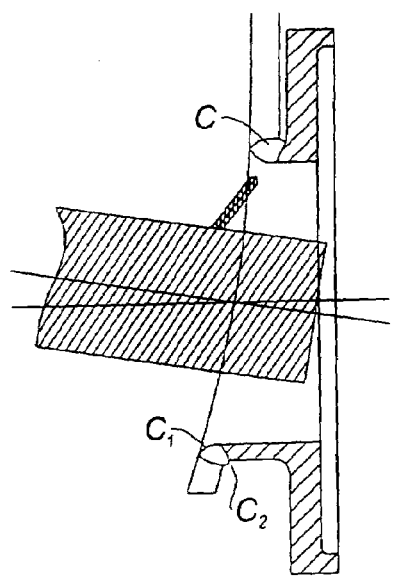
FIG. 3 shows both parts after welding.

FIG. 3 represents the spark plug guide welded to the external jacket of the combustion chamber. Thanks to the method of the invention, the welding bead C has a radial shape C1 without any bulb in the gas stream on the chamber side as well as on the tube side. A bulb or a fillet C2 is formed opposite in the re-entrant angle defined by formed by the walls 13 and 11.

The presence of the bulb enables simple visual control of the quality of the weld seam.

Figure 4:
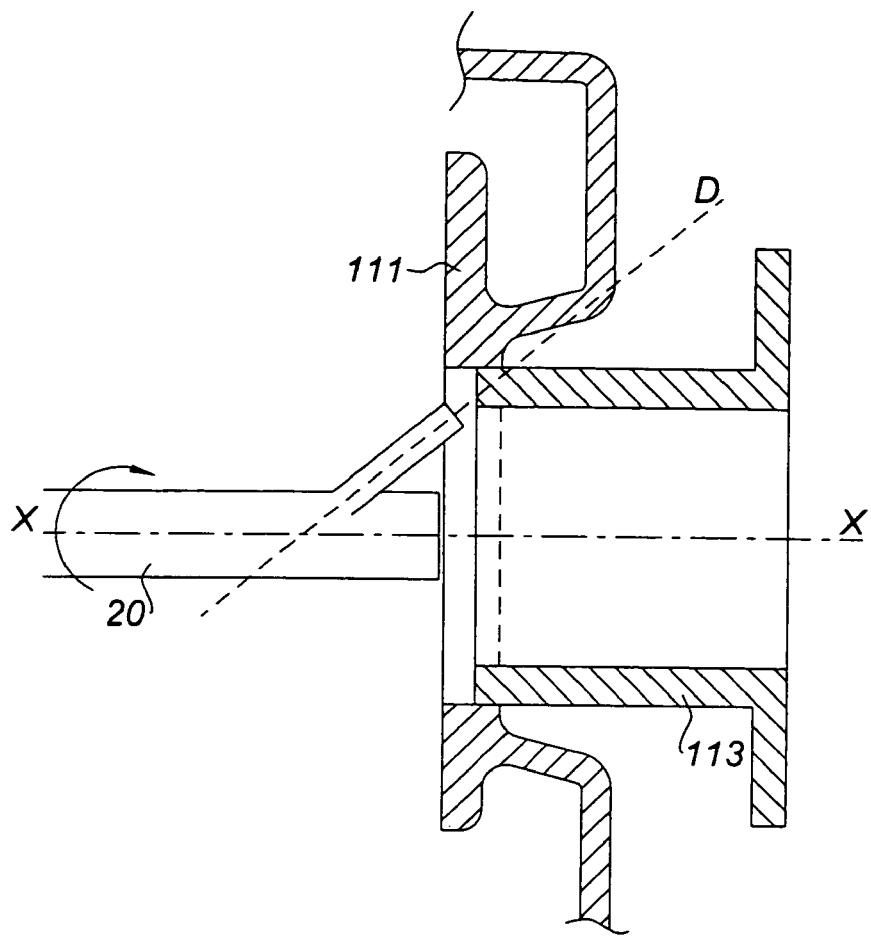
FIG. 4 shows a second embodiment of the invention.

A variation of the method in relation with FIG. 4 will now be described.

The jacket 111 of the combustion chamber is for example cylindrical and its geometry does not allow providing a countersink as in the previous case, for example because of its curvature. The jacket has been drilled with a right-angle bore. A guide tube has been placed in the opening whereof the wall 113 is adjusted with respect to the edges of the orifice of the jacket 111. The end of the tube has been arranged slightly recessed with respect to the internal face of the jacket. Provisional attachment may be provided by various means whereof for example one or several welding points deposited manually. The electrode holder is then installed so that the tip of the electrode lies at a set distance from the ridge of the guide tube. Here, the axis merges with that of the tube. The direction D of the axis of the electrode runs preferably through the point P at the intersection of the walls of the re-entrant angle formed by the walls 111 and 113, at least over a portion of the trajectory of the electrode.

The welding process is performed by rotating the electrode holder around its axis; the forward speed and the intensity of the current are caused to vary in relation to the local thickness of the metal to be welded as in the previous example.

Figure 5:
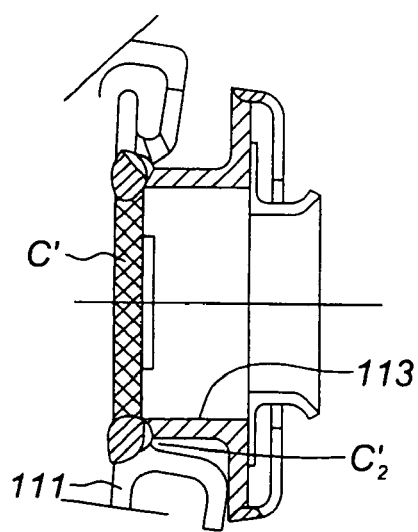
FIG. 5 shows the detail of the weld seam according to the second embodiment.

FIG. 5 shows a welding bead C' formed by the operation. The method enables to control visually that the penetration of the welding bead is satisfactory by the presence of a bulb C'2 behind the welding bead.

The invention claimed is:

1. A TIG welding method comprising the steps of:
   providing a spark plug guide, said spark plug guide including a guide wall terminating in an end edge;
   providing a combustion chamber jacket of a gas turbine motor, said combustion chamber jacket including a jacket wall having an orifice, said orifice having an edge;
   providing a TIG welding electrode having a longitudinal axis;
   aligning the end edge of the spark plug guide to the edge of the orifice of the combustion chamber jacket to thereby define an intersection portion of the spark plug guide with the combustion chamber jacket, the intersection portion lying in a jointing plane;
   aligning the TIG welding electrode at an angle with respect to the guide wall smaller than 180° and with the longitudinal axis of the TIG welding electrode running through the intersection portion of the jointing plane; and
   moving the TIG welding electrode to weld the spark plug guide to the combustion chamber jacket without using any external filler.

2. The method according to claim 1, wherein sufficient welding energy is applied to form a fillet.

3. The method according to claim 1, wherein the guide wall is cylindrical.

4. The method according to claim 1, wherein the TIG welding electrode is positioned within the orifice of the combustion chamber jacket during the step of moving the TIG welding electrode to weld the spark plug guide to the combustion chamber jacket.

5. The method according to claim 1, wherein the jacket wall forms a projection along the intersection portion of the jointing plane before welding.

6. The method according to claim 1, wherein the jacket wall has a countersink against which the end edge of the guide wall rests before welding.

7. The method according to claim 1, wherein displacement speed and intensity of current are varied during movement of the TIG welding electrode.

8. The method according to claim 1, wherein the TIG welding electrode provides direct heat to one of said guide wall or said jacket wall and provides only indirect heat to the other of said guide wall or said jacket wall.

9. The method according to claim 1, wherein the intersection portion lying in the jointing plane forms an acute angle with said guide wall.

10. The method according to claim 1, wherein the end edge forms an acute angle with said guide wall.

* * * * *